(12) United States Patent
Rommelfanger et al.

(10) Patent No.: US 11,498,385 B2
(45) Date of Patent: Nov. 15, 2022

(54) MOTOR VEHICLE AIR-CONDITIONING LINE VALVE ARRANGEMENT

(71) Applicant: Dr. Ing. h.c.F. Porsche Aktiengesellschaft, Stuttgart (DE)

(72) Inventors: Christian Rommelfanger, Leonberg (DE); Philipp Bolay, Rutesheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 311 days.

(21) Appl. No.: 16/852,570

(22) Filed: Apr. 20, 2020

(65) Prior Publication Data

US 2020/0338952 A1 Oct. 29, 2020

(30) Foreign Application Priority Data

Apr. 24, 2019 (DE) ...................... 10 2019 110 563.3

(51) Int. Cl.
| | |
|---|---|
| *F24F 13/10* | (2006.01) |
| *F16K 13/00* | (2006.01) |
| *F16K 31/02* | (2006.01) |
| *B60H 1/00* | (2006.01) |

(52) U.S. Cl.
CPC ....... *B60H 1/00485* (2013.01); *B60H 1/0065* (2013.01); *B60H 1/00428* (2013.01); *B60H 1/00857* (2013.01); *B60H 1/00885* (2013.01); *B60H 1/00664* (2013.01); *B60H 1/00835* (2013.01); *F16K 13/00* (2013.01); *F16K 31/02* (2013.01); *F24F 13/10* (2013.01)

(58) Field of Classification Search
CPC .... F16K 41/10; F16K 41/103; F16K 99/0051; F16K 99/0049
See application file for complete search history.

(56) References Cited

U.S. PATENT DOCUMENTS

| | | | |
|---|---|---|---|
| 5,868,616 A * | 2/1999 | Ohsaki .................. | F04D 29/703 454/75 |
| 9,487,890 B1 * | 11/2016 | Farrell ...................... | D03D 1/00 |
| 2005/0075064 A1 * | 4/2005 | Omiya ................... | B60H 1/249 454/162 |

(Continued)

FOREIGN PATENT DOCUMENTS

| | | | |
|---|---|---|---|
| EP | 0031623 A1 | 7/1981 | |
| GB | 2346960 A | 8/2000 | |
| WO | WO-2019216069 A1 * | 11/2019 | ........... B60H 1/3407 |

*Primary Examiner* — Nelson J Nieves
(74) *Attorney, Agent, or Firm* — Leydig, Voit & Mayer, Ltd.

(57) ABSTRACT

A motor vehicle air-conditioning line valve arrangement includes a line valve having an air-conditioning line body which is of substantially closed design in a transverse plane, and a fiber nonwoven arranged on an inside in the air-conditioning line body and having a nonwoven mat to which a large number of nonwoven fibers are fixed. The nonwoven fibers are fixed to the nonwoven mat at one end and configured to be electrostatically charged by the nonwoven mat. An electrical charge generator is electrically connected to the nonwoven mat and configured to electrostatically charge the fiber nonwoven, so that the electrostatically charged nonwoven fibers straighten toward a center of the air-conditioning line body in such a way that they close an open flow cross section of the air-conditioning line body.

8 Claims, 3 Drawing Sheets

(56) References Cited

U.S. PATENT DOCUMENTS

| | | | |
|---|---|---|---|
| 2005/0092944 A1* | 5/2005 | Patterson | F16K 7/08 251/4 |
| 2007/0022721 A1* | 2/2007 | Goupil | B60H 3/0658 55/309 |
| 2007/0026787 A1* | 2/2007 | Goupil | B60H 1/00671 454/121 |
| 2010/0294132 A1* | 11/2010 | Ishida | B60H 3/06 55/486 |
| 2012/0003894 A1* | 1/2012 | Sumiya | B60H 3/0658 264/483 |
| 2012/0219462 A1* | 8/2012 | Nozaki | F24F 3/16 96/138 |
| 2015/0078964 A1* | 3/2015 | Meirav | B01J 20/28035 96/144 |
| 2017/0030609 A1* | 2/2017 | Kjetil | C09D 7/63 |
| 2017/0036217 A1* | 2/2017 | Barkie | B03C 3/36 |
| 2017/0261215 A1* | 9/2017 | Kwon | F24F 1/0033 |
| 2018/0328601 A1* | 11/2018 | Weickert | F24F 12/006 |
| 2019/0017854 A1* | 1/2019 | Keeney-Ritchie | F16K 7/045 |

* cited by examiner

MOTOR VEHICLE AIR-CONDITIONING LINE VALVE ARRANGEMENT

CROSS REFERENCE TO RELATED APPLICATIONS

This application claims benefit to German Patent Application No. DE 10 2019 110 563.3, filed Apr. 24, 2019, which is hereby incorporated by reference herein.

FIELD

The invention relates to a motor vehicle air-conditioning line valve arrangement comprising an adjustable line valve by way of which the flow of conditioning air can be restricted and/or stopped as required.

BACKGROUND

Air-conditioning lines are laid in motor vehicles in order to conduct conditioning air into the interior of a vehicle or to carry away or discharge conditioning air from the interior of the vehicle. The conditioning air can be untreated, but can also have been preheated or precooled.

The prior art discloses air-conditioning line valves which are realized by rotatable or pivotable valve flaps. Air-conditioning line valves of this kind require an appropriate drive and actuation mechanism outside the air-conditioning line body, which drive and actuation mechanism takes up a corresponding amount of installation space outside the air-conditioning line body.

SUMMARY

In an embodiment, the present invention provides a motor vehicle air-conditioning line valve arrangement. The arrangement includes a line valve, having an air-conditioning line body which is of substantially closed design in a transverse plane, and a fiber nonwoven arranged on an inside in the air-conditioning line body and having a nonwoven mat to which a large number of nonwoven fibers are fixed. The nonwoven fibers are fixed to the nonwoven mat at one end and configured to be electrostatically charged by the nonwoven mat. An electrical charge generator is electrically connected to the nonwoven mat and configured to electrostatically charge the fiber nonwoven, so that the electrostatically charged nonwoven fibers straighten toward a center of the air-conditioning line body in such a way that they close an open flow cross section of the air-conditioning line body.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
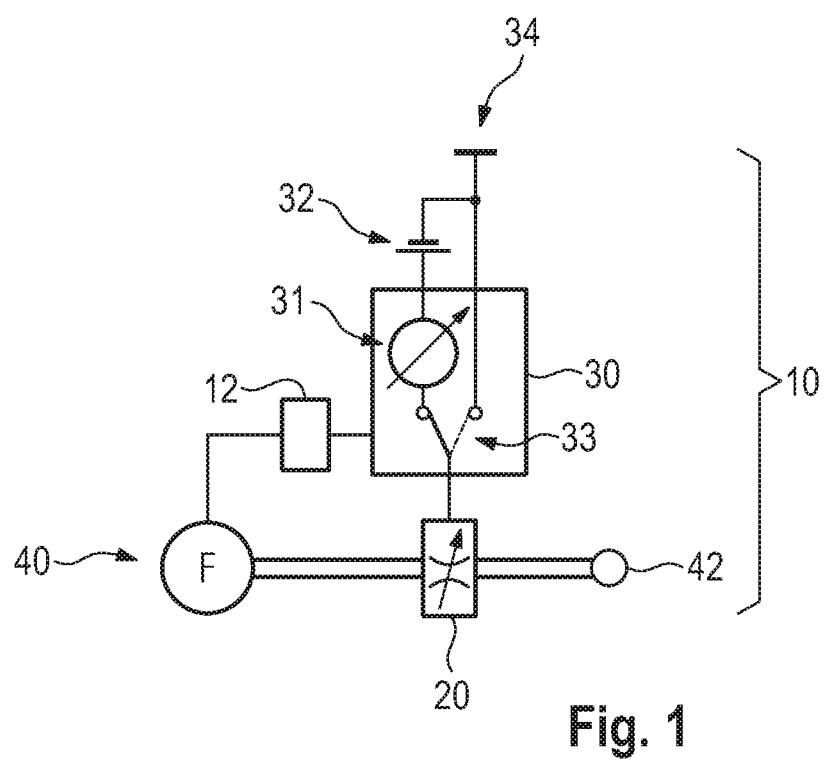
FIG. 1 shows a schematic overview of an air-conditioning arrangement comprising a motor vehicle air-conditioning line valve arrangement.

The present application describes compact motor vehicle air-conditioning line valve arrangements.

According to an embodiment, the present application describes an air-conditioning line valve arrangement which has a line valve and an electrical charge generator. The line valve has an air-conditioning line body which is of substantially closed design in the transverse plane, a fiber nonwoven being arranged on the inside of said air-conditioning line body and being formed from a nonwoven mat to which a large number of nonwoven fibers are fixed. The nonwoven fibers can be electrostatically charged by means of the nonwoven mat.

The electrical charge generator is electrically connected to the nonwoven mat, and therefore the fiber nonwoven can be electrically charged by the charge generator. The charge generator generates a voltage of several 1000 V. The electrostatically charged nonwoven fibers repel each other and as a result straighten toward the center of the air-conditioning line body in such a way that they radially protrude into the open flow cross section of the air-conditioning line body and at least partially close said flow cross section, that is to say create a more or less large flow resistance.

In order to open the line valve, the fiber nonwoven is electrically connected to ground or earth, so that the electrical charge of the fiber nonwoven is neutralized again. As soon as conditioning air which has been accelerated by a fan flows through the line valve, the nonwoven fibers are laid against the inside of the air-conditioning line body by the air flow, and therefore the fluid restriction is minimized. The electrical discharge can take place without resistance, but alternatively can also be passed across an electrical resistor, so that the discharge process takes place slowly and the line valve opens again correspondingly slowly.

No actuator system or mechanical system is required outside the air-conditioning line body, and therefore no installation space for the line valve is required in the immediate vicinity of the air-conditioning line body. The electrical charge generator for feeding electrical power to the fiber nonwoven can be accommodated at a suitable remote location in the motor vehicle.

The fiber nonwoven which is arranged over the entire circumference of the air-conditioning line body has a sound-absorbing effect, and therefore a fan which is arranged upstream of the valve arrangement is less audible downstream of the valve arrangement.

The electrical charge generator preferably generates an infinitely adjustable high electrical voltage, so that the degree of straightening of the nonwoven fibers and therefore the degree of flow restriction in the air-conditioning line body can be adjusted, particularly preferably can be infinitely adjusted.

According to a preferred refinement, the electrical charge generator has a ground switch by means of which the fiber nonwoven can be electrically connected to ground when the ground switch is appropriately switched. The ground switch can be realized in mechanical or electronic form. As soon as the electrically charged fiber nonwoven is connected to electrical ground by means of the ground switch, the electrical charge will be discharged from the fiber nonwoven and the nonwoven fibers, so that said nonwoven fibers no longer repel each other.

The air-conditioning line body is preferably an electrical insulator, so that the fiber nonwoven cannot be unintentionally discharged by means of the air-conditioning line body.

The fiber nonwoven preferably has more than 1000, particularly preferably more than 10,000, nonwoven fibers, and particularly preferably consists of a plastic. Owing to the high number of nonwoven fibers, a line valve can be realized which allows virtually zero flow of fluid when the greatest possible electrostatic charge is applied to the fiber nonwoven.

According to a preferred refinement, the length of the nonwoven fibers is at least ⅓ of the smallest clear width of the air-conditioning line body in a transverse plane, and is particularly preferably approximately ½ of the smallest clear width of the air-conditioning line body. Therefore, the electrostatically charged nonwoven fibers touch or overlap possibly in the center of the air-conditioning line body by way of their free ends.

FIG. 1 schematically illustrates a motor vehicle air-conditioning line valve arrangement 10 which is substantially formed by a line valve 20 and an electrical charge generator 30 by way of which the line valve 20 is controlled. An electrical air fan 40 is provided upstream of the line valve 20 and blows conditioning air through an air-conditioning line to the line valve 20, from where the conditioning air flows downstream to an air outlet 42 in the interior of the motor vehicle when the line valve 20 is at least partially open. The charge generator 30 and the air fan 40 are subject to open-loop or closed-loop control by an electronic air-conditioning controller 12.

Figure 2:
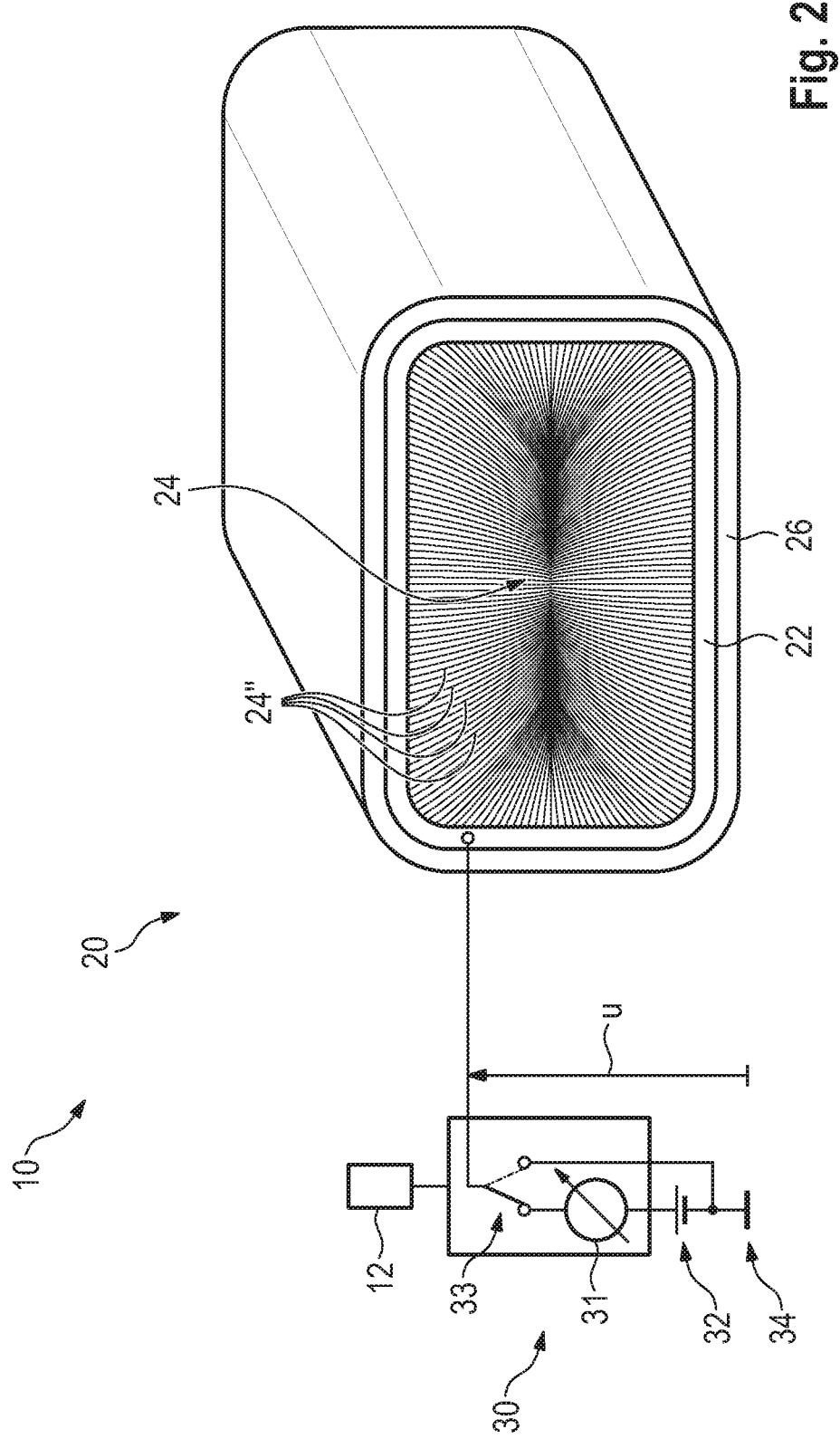
FIG. 2 shows the air-conditioning line valve arrangement of FIG. 1 with a closed line valve.
Figure 3:
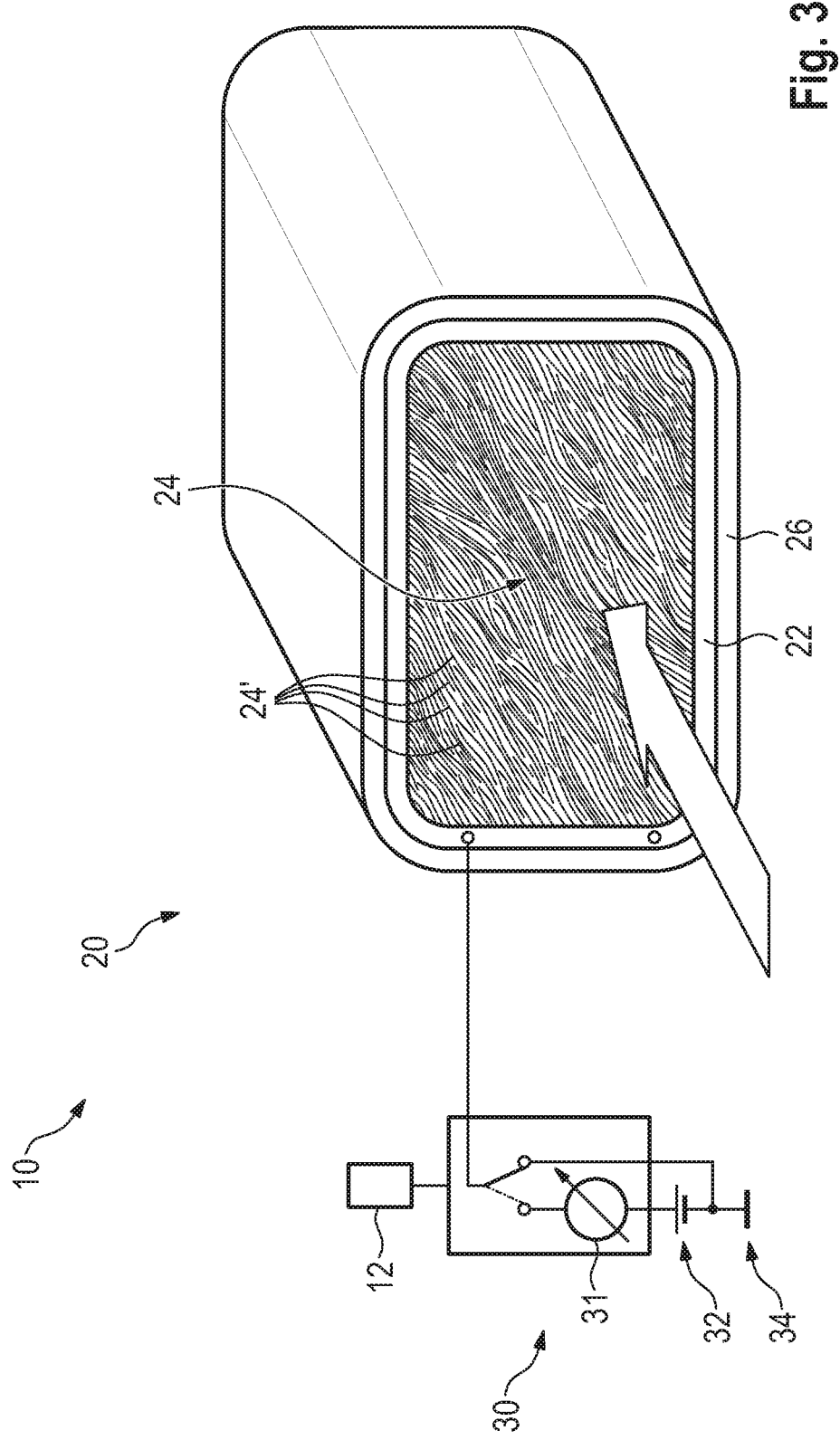
FIG. 3 shows the air-conditioning line valve arrangement of FIG. 1 with an open line valve.

The motor vehicle air-conditioning line valve arrangement 10 is illustrated in detail in FIGS. 2 and 3. The line valve 20 has an air-conditioning line body 26 which is of closed and substantially rectangular design as viewed in the transverse plane and is composed of an electrically non-conductive plastic. The inside of the air-conditioning line body 26 is lined with a fiber nonwoven 24 over its entire surface area, said fiber nonwoven being formed by a nonwoven mat 22 and a large number of nonwoven fibers 24', 24" which are fixed to said nonwoven mat at one end. The fiber nonwoven 24 is integrally formed from plastic and has 10,000-100,000 individual nonwoven fibers 24', 24". The length of the nonwoven fibers 24', 24" corresponds approximately to half the smallest clear width of the air-conditioning line body 26, so that the fully electrically charged and, respectively, straightened nonwoven fibers 24" touch or overlap in the center of the air-conditioning line body 26 by way of their free ends.

The electrical charge generator 30 is electrically connected to the nonwoven mat 22 by means of an electrical line. The charge generator 30 has a ground switch 33 by means of which the fiber nonwoven 24 can be selectively connected to the electrical ground connection 34, or an infinitely adjustable electrical voltage U from the high-voltage generator 31 can be applied to said fiber nonwoven. The high-voltage generator 31 is fed with 12 V or 48 V by a motor vehicle battery 32 and can generate an electrical voltage of up to 10,000 V.

In FIG. 3, the charge generator 30 is switched off, so that the fiber nonwoven 24 is connected to the electrical motor vehicle ground connection 34. As a result, the nonwoven fibers 24' respectively have no charge to the outside, but rather are electrically neutral. As soon as the fan 40 is active, the nonwoven fibers 24' lay against the inner wall of the air-conditioning line body 26 in the flow direction, and therefore the conditioning-air stream is subject to only a little resistance. In this state, the valve arrangement 10 is open.

In order to close the valve arrangement 10, the ground switch 33 is switched over in such a way that the high voltage which is generated by the high-voltage generator 31 is applied to the fiber nonwoven 24. Since the nonwoven fibers 24" are positively electrically charged as a result, they repel each other and straighten in such a way that they close the entire flow cross section of the air-conditioning line body 26 to such an extent that no significant flow of conditioning air can pass the valve arrangement 10 even when the fan 40 is running. In this state, the valve arrangement 10 is closed to fluid.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A motor vehicle air-conditioning line valve arrangement, comprising:
    a line valve, having:
    an air-conditioning line body which is of substantially closed design in a transverse plane,
    a fiber nonwoven arranged on an inside in the air-conditioning line body and having a nonwoven mat to which a large number of nonwoven fibers are fixed, the nonwoven fibers being fixed to the nonwoven mat at one end and configured to be electrostatically charged by the nonwoven mat, and
    an electrical charge generator electrically connected to the nonwoven mat and configured to electrostatically charge the fiber nonwoven, so that the electrostatically charged nonwoven fibers straighten toward a center of the air-conditioning line body in such a way that they close an open flow cross section of the air-conditioning line body.

2. The motor vehicle air-conditioning line valve arrangement as claimed in claim 1, wherein the electrical charge generator generates an adjustable voltage, so that a degree of straightening of the nonwoven fibers can be adjusted.

3. The motor vehicle air-conditioning line valve arrangement as claimed in claim 1, wherein the electrical charge generator has a ground switch by which the fiber nonwoven can be electrically connected to ground.

4. The motor vehicle air-conditioning line valve arrangement as claimed in claim 1, wherein the air-conditioning line body is an electrical insulator.

5. The motor vehicle air-conditioning line valve arrangement as claimed in claim 1, wherein the fiber nonwoven has more than 1000, nonwoven fibers.

6. The motor vehicle air-conditioning line valve arrangement as claimed in claim 1, wherein the fiber nonwoven consists of a plastic.

7. The motor vehicle air-conditioning line valve arrangement as claimed in claim 1, wherein a length of the nonwoven fibers is at least ⅓ of a smallest clear width of the air-conditioning line body.

8. A motor vehicle air-conditioning line valve arrangement, comprising:
   a line valve, having:
   an air-conditioning line body which has a tubular cross-section transverse to a flow direction through the air-conditioning line body,
   a fiber nonwoven arranged on an inside in the air-conditioning line body and having a nonwoven mat to which a large number of nonwoven fibers are fixed, the nonwoven fibers being fixed to the nonwoven mat at one end and configured to be electrostatically charged by the nonwoven mat, and
   an electrical charge generator electrically connected to the nonwoven mat and configured to electrostatically charge the fiber nonwoven, so that the electrostatically charged nonwoven fibers straighten toward a center of the air-conditioning line body in such a way that they close an open flow cross section of the air-conditioning line body.

* * * * *